June 10, 1947.                F. C. SIMON                2,421,763
                              PRESS CAGE
                         Filed June 9, 1944              2 Sheets-Sheet 1

INVENTOR
Forrest C. Simon,
BY
ATTORNEY

June 10, 1947. F. C. SIMON 2,421,763
PRESS CAGE
Filed June 9, 1944 2 Sheets-Sheet 2
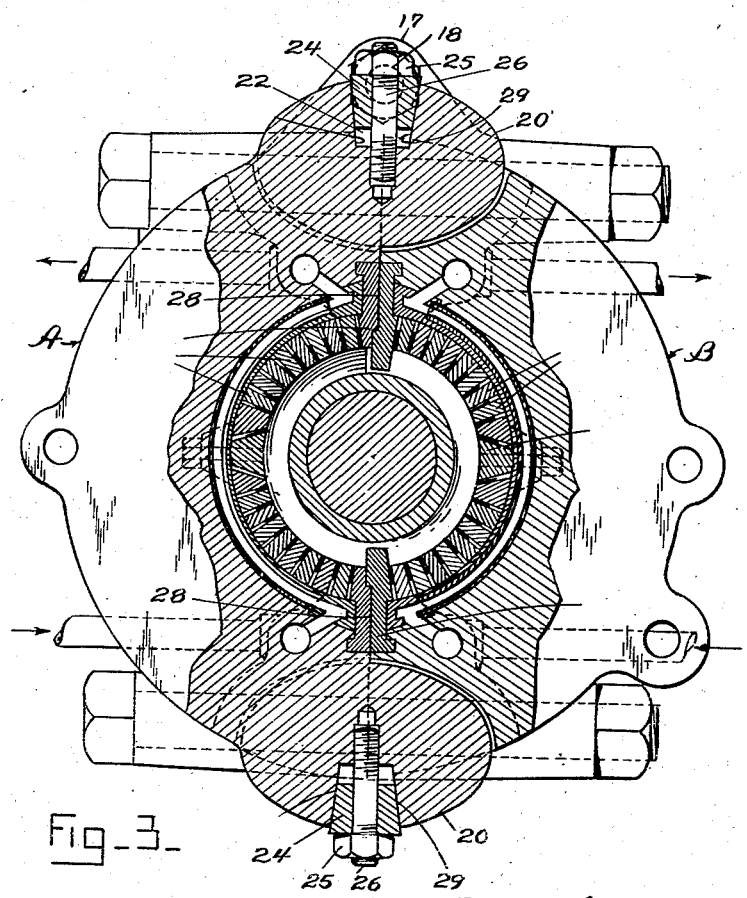
Fig-3-
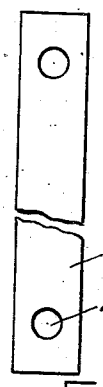
Fig-5-
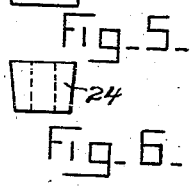
Fig-6-
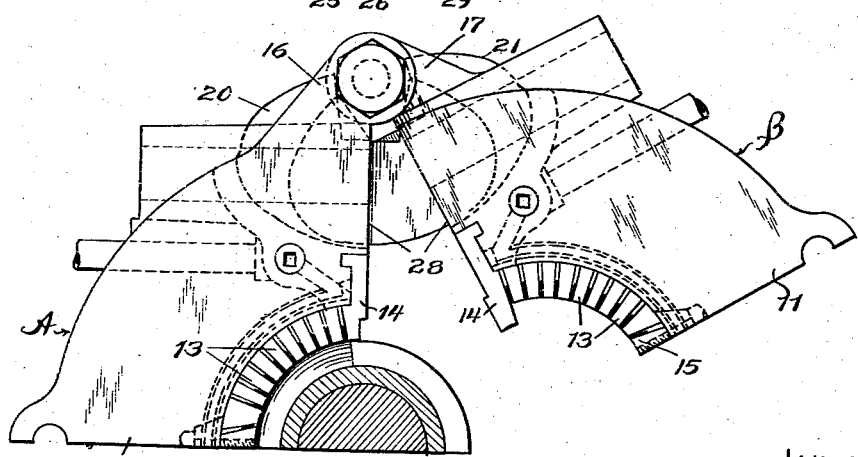
Fig-4-
INVENTOR
Forrest C. Simon,
BY
ATTORNEY Patented June 10, 1947

2,421,763

UNITED STATES PATENT OFFICE 2,421,763

PRESS CAGE

Forrest C. Simon, Piqua, Ohio, assignor to The French Oil Mill Machinery Co., Piqua, Ohio Application June 9, 1944, Serial No. 539,423

9 Claims. (Cl. 100—50)

This invention relates to the cages or barrels of presses and more particularly to improvements in the cages of continuous or screw presses of that kind, used for expressing oil or liquid from oil bearing or other materials, in which a screw or worm device rotating in the cage forces material through the cage and out through a restricted discharge opening of the cage, thereby compressing the material and expressing the liquid content thereof, which escapes through drainage apertures in the cage wall or walls.

In presses of this type employed for expressing oil from oil bearing materials, such for example as cotton seed meal, the cage commonly used comprises an apertured lining or wall bounding the pressing chamber and formed by spaced, longitudinal drainage bars arranged in a circular or cylindrical formation in a strong surrounding frame of cast steel or the like. This outer frame may be of skeletonized form with numerous circumferential ribs separated by openings for the passage of liquid which escapes from the pressing chamber through the narrow slits between the drainage bars, and usually this cage is divided longitudinally into halves or sections which are separably secured together by numerous bolts connecting the sections along their opposite longitudinal edges to permit separation of the sections for access to the drainage bars and other parts within the cage.

In the operation of such presses, great pressures are developed in the cage and, therefore, a large number of closely spaced bolts is required to tightly close the joints between the cage sections and secure the sections together with the necessary strength to withstand said pressures, there being, in presses as heretofore constructed a pair of bolts at the opposite ends of each of the numerous circumferential ribs of each section. It is necessary to open the cage at more or less frequent intervals, as when the press becomes clogged or sticks, due to failure of power, or for assembling or adjusting the drainage bars in the cage, or replacing worn or broken parts of the cage, such as the drainage bars, breaker bars, etc. or for the removal and replacement of parts of the rotary worm or screw device. Because of the large number of fastening bolts for the cage sections and the pitch of the threads thereof, it requires a large amount of time both to tighten up the bolts in securing the cage sections together and to remove the bolts for opening up the cage. Also, it is particularly difficult to take one of these cages apart after it has been used for a time and the bolts have become set and stuck in the cage, due to the fact that the fiber or foots and oil from the material being pressed work into the threads. These fibers pack and become baked hard in the threads, due to the heat developed in the pressing operation, so that sometimes it is even necessary to heat the bolts with a torch for softening up the material filling the threads, in order to start the bolts. Thus, it is difficult and takes many hours of hard work to take the cage apart and put it together, thereby causing much loss of time and production capacity.

A primary object of my invention is to eliminate to a large extent the hard work and long hours required with cages of the construction at present in use for removing and replacing the securing bolts in opening up and again securing the cage sections together.

Other objects of the invention are to provide practical and desirable securing means for the separable sections of press cages, which will insure tight joints and a strong, reliable connection between the sections, but which can be readily and quickly operated to release the sections or fasten them together; and also to provide fastening or securing means of improved, novel construction for the separable sections of press cages.

Further objects and advantages of the invention will appear from the following specification of the preferred embodiment of the invention shown in the accompanying drawings, and the novel features of the invention are set forth in the appended claims.

In said drawings:

Fig. 3 is a similar transverse, sectional elevation thereof, on line 3—3, Fig. 1.

Fig. 4 is a fragmentary end elevation, partly in section, of the cage, showing the sections in spread apart or open relation.

Fig. 5 is a plan view, detached, of one of the locking or fastening bars for the cage sections.

Fig. 6 is an end elevation thereof.

Figure 1:
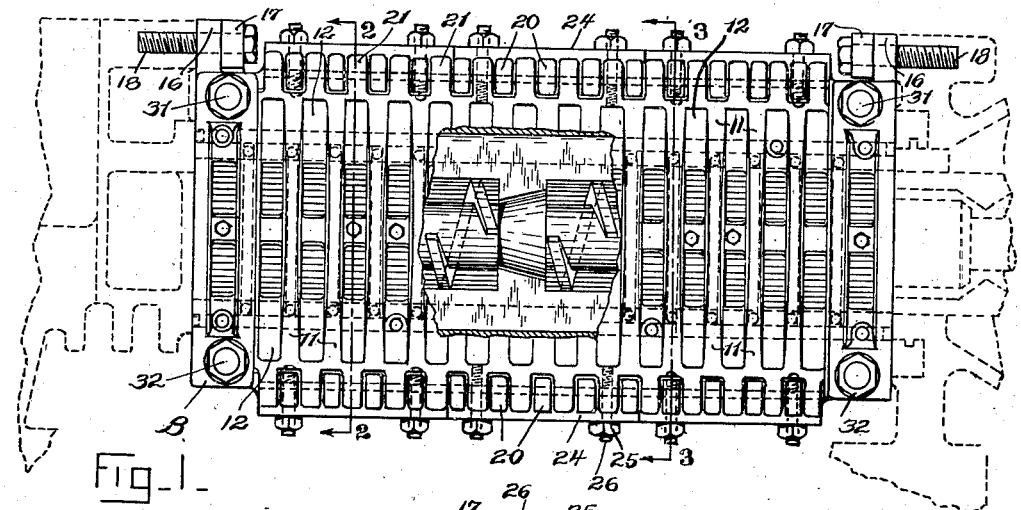
Fig. 1 is a side elevation of a press cage embodying my invention, a portion of the cage being broken away to show internal parts.

The press cage, except for the fastening means for separably securing together the cage sections, may be of usual or suitable construction, cage of well know type being illustrated in the drawings. This cage comprises a strong outer or reinforcing frame for the apertured drainage wall or lining of the cage divided longitudinally into two halves or sections A and B, each of which is of skeletonized substantially semi-cylindrical form having parallel spaced ribs 11 which extend transversely or circumferentially of the cage and are joined at their opposite ends by longitudinally extending connecting bars or portions 12 of the frame section. These sections or halves are secured together edge to edge and form within them a cylindrical cavity or pressing chamber bounded by the cylindrical apertured drainage wall or lining, which may be composed largely of longitudinal, parallel bars 13 separated by narrow spaces or slits forming the drainage apertures for the expressed liquid. A number of these drainage bars are provided in each outer frame half or section, and the bars may be secured in the frame section in the usual manner between longitudinal abutment bars 14 at the opposite, longitudinal edges of the section, and wedge bars 15, which are operable for clamping and removably securing the drainage bars in place. As shown, the cage sections A and B are supported at their upper edges on the press frame, as by hinge lugs 16 and 17 at opposite ends of the frame sections through which hinge bolts 18 pass into the press frame, whereby the sections are hingedly mounted so that they can be swung toward and from each other, as indicated in Fig. 4, for closing and opening the cage. As thus far described, the cage is of known or usual construction.

Figure 2:
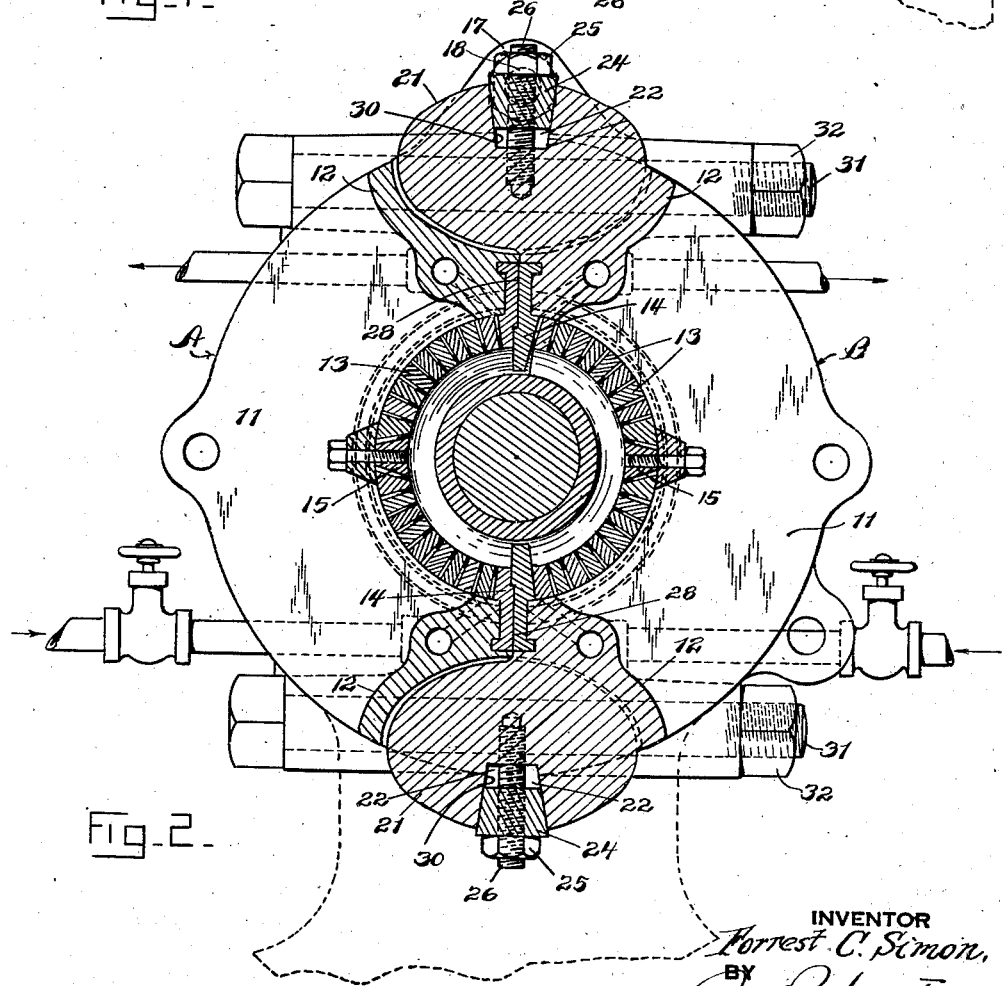
Fig. 2 is a transverse, sectional elevation thereof on a larger scale, on line 2—2, Fig. 1.

The cage half or section A is formed along its opposite or top and bottom longtiudinal edges with a series of relatively closely spaced integral lugs 20, see Fig. 2, which project laterally from the section, and similarly the other cage section B, see Fig. 2, is formed along its opposite or top and bottom longitudinal edges with similar spaced lugs 21 which project laterally therefrom in a direction opposite to that in which the lugs 20 project from their section. The lugs 20 and 21 are disposed in staggered relation on the two sections so that the lugs on each section are arranged to enter the spaces between the lugs on the other section with the lugs 20 and 21 overlapping each other when the two sections are brought together. Or, in other words, the lugs on the two sections alternate with and are adapted to interfit between each other when the sections are together. Notches 22 are formed in the outer edges of the several lugs 20 and 21, and when the cage sections are brought together with the lugs of one section interfitting between the lugs of the other section, the notches 22 in the several interfitting lugs will be alined with each other, whereby longitudinally extending locking bars 24 may be inserted in the alined notches of the interfitting lugs of the opposite sections and thus hold the sections from separation. These locking bars and their receiving notches 22 preferably taper inwardly or are of wedge shape in cross section, and the bars are adapted to be forcibly moved into the tapering notches of the lugs, as by nuts 25 screwed on threaded studs 26 projecting from certain of the lugs 20 or 21 through holes 27 in the locking bars 24. By tightening these nuts, the locking bars are wedged tightly into the tapering notches and thus serve to draw the sections firmly toward each other and securely hold them with the radial faces 28 of the longitudinal edge portions of the sections abutting tightly face to face, so as to ensure tight joints between the cage sections.

Preferably, as shown, each of the locking bars 24 at the top and bottom of the cage is made in a plurality of sections, say for example, three, alined end to end, instead of being a single long bar, and two screw studs and nuts 26, 25 for each bar section are provided so as thereby to insure a better wedging action of the locking bars into the lug notches, and a more perfect contact and tighter joint between the abutting longitudinal edge faces 28 of the cage sections throughout their whole longitudinal length. The tighter the locking bars are forced into the notches, the tighter the cage sections will be drawn together.

The notched lugs 20, 21 form in effect, interfitting or overlapping hooks projecting oppositely from the adjacent cage sections A and B and having inwardly facing edges or faces 29 and 30, of which the edges 29 of the hooks 20 of one cage section face oppositely or are opposed with reference to the edges 30 of the hooks 21 of the other cage section, and these edges incline or taper inwardly towards each other so that the forcing of the locking bars 24 in between these opposing edges acts to draw the hooks and cage sections towards each other. Therefore, it is not necessary that the lugs or hooks shall have tapered notches each with opposing edges or faces.

With the securing or fastening means for the cage sections constructed as described, the sections can be readily fastened tightly together and released for separation by the operation of a relatively few securing screws or nuts for the locking bars instead of the large number of fastening bolts heretofore employed in press cages of this type and, therefore, the cage can be quickly and easily opened up and again closed, and its sections firmly and strongly secured in their closed relation.

In the cage as illustrated, four transverse bolts 31 and nuts 32 are shown which secure the cage halves or sections together at the four corners or top and bottom of the opposite ends of the cage sections with the series of interfitting lugs or hooks interposed between the bolts at opposite ends of the cage. The presence of the supporting hinge lugs 16 and 17 at the ends of the sections does not leave room for connecting lugs or hooks 20, 21 at these points, so these corner bolts take their place. The bolts 31 provide convenient means for preliminarily securing together the two hinged sections or halves of the cage until they are permanently connected by securing in place the wedge locking bars 24. The bolts 31 are preferably slightly tapered and can be easily removed. While the corner bolts 31 form a convenient adjunct to the locking bar and lug or hook fastenings, they are not essential and may or may not be employed, as preferred.

I claim as my invention:

1. In a press cage which has an apertured wall bounding a pressing chamber and is divided longitudinally into separable sections, the improved means for separably securing said sections together comprising lugs disposed in spaced relation along contiguous edges of said sections with the lugs on one section overlapping the lugs on the adjacent section, said overlapping lugs having open-sided notches which extend across the outer edges of the lugs and are alineable lengthwise of said edges of said sections, and a locking bar which is removably secured in said alined notches and locks the overlapping lugs together.

2. In a press cage which has an apertured wall bounding a pressing chamber and is divided longitudinally into separable sections, the improved means for separably securing said sections together comprising laterally projecting lugs disposed in spaced relation along contiguous edges of said sections with the lugs on each section projecting into the spaces between the lugs on the adjacent section, said lugs having open-sided notches which cross said lugs and are alineable lengthwise of said edges of the sections, and a locking bar which is insertable laterally and removably secured in said alined notches and locks the lugs of the adjacent sections together.

3. The improved securing means for press cage sections according to claim 2, in which said lug notches are tapered inwardly, and securing means force said locking bar into said notches and draw said edges of the cage sections tightly together.

4. The improved securing means for press cage sections according to claim 2, in which said lug notches are tapered inwardly, and securing screws force said locking bar into said notches and forcibly draw said edges of the cage sections tightly together.

5. In a press cage which has an apertured wall bounding a pressing chamber and is divided longitudinally into separable sections, the improved means for separably securing said sections together comprising laterally projecting hooks disposed in spaced relation along contiguous edges of said sections with the hooks on each section projecting into the spaces between the hooks on the adjacent section, the hooks of the adjacent sections having separated inwardly facing opposed edges, and a locking bar which is removably secured between said opposed edges and locks the hooks of the adjacent sections together.

6. In an expressing press cage which has an outer frame lined with spaced drainage bars bounding a press chamber, and which is divided longitudinally into sections which are separable for access to said drainage bars, the improved means for separably securing said sections together comprising laterally projecting hooks disposed in spaced relation along contiguous edges of said sections with the hooks on each section projecting into the spaces between the hooks on the adjacent section, the hooks of the adjacent sections having separated inwardly facing opposed edges, and a locking bar which is removably secured between said opposed edges and locks the hooks of the adjacent sections together.

7. The improved securing means for press cage sections according to claim 2, in which said locking bar comprises sections alined end to end with separate securing means for each bar section.

8. In a press cage which has an apertured wall bounding a pressing chamber and is divided longitudinally into separable sections, the improved means for separably securing said sections together comprising transverse bolts connecting said sections at opposite ends thereof, and laterally projecting hooks disposed in spaced relation along contiguous edges of said sections between said end connecting bolts with the hooks on one section overlapping the hooks on the adjacent section, said hooks on adjacent cage sections having opposed inwardly facing edges, and a locking bar which is removably secured between said opposed edges of the hooks of the adjacent cage sections and locks the overlapping hooks together.

9. The improved securing means for press cage sections according to claim 5, in which said locking bar is of wedge-like cross section and acts by being wedged between said opposed edges of said hooks to forcibly draw the cage sections together.

FORREST C. SIMON.

REFERENCES CITED

The following references are of record in the file of this patent:

UNITED STATES PATENTS

| Number | Name | Date |
| --- | --- | --- |
| 152,014 | Seeburger | June 16, 1874 |
| 731,735 | Anderson | June 23, 1903 |
| 2,138,670 | Upton | Nov. 29, 1938 |
| 1,733,381 | Meakin | Oct. 29, 1929 |
| 1,709,349 | Hollstein | Apr. 16, 1929 |
| 117,119 | Smith | July 18, 1871 |

FOREIGN PATENTS

| Number | Country | Date |
| --- | --- | --- |
| 127,718 | Great Britain | June 4, 1919 |